(12) United States Patent
Lauder

(10) Patent No.: US 6,802,019 B1
(45) Date of Patent: Oct. 5, 2004

(54) METHOD AND SYSTEM FOR SYNCHRONIZING DATA

(75) Inventor: Doug Lauder, Brampton (CA)

(73) Assignee: Genesys Conferencing, Ltd., Toronto (CA)

( * ) Notice: Subject to any disclaimer, the term of this patent is extended or adjusted under 35 U.S.C. 154(b) by 536 days.

(21) Appl. No.: 09/596,025

(22) Filed: Jun. 15, 2000

(51) Int. Cl.[7] .............................................. H04L 7/00
(52) U.S. Cl. ..................... 713/400; 713/400; 713/600; 709/204; 709/231
(58) Field of Search .................. 713/400; 709/204, 709/231

(56) References Cited

U.S. PATENT DOCUMENTS

| | | | | |
|---|---|---|---|---|
| 5,774,666 A | * | 6/1998 | Portuesi | 725/110 |
| 5,790,840 A | * | 8/1998 | Bulka et al. | 713/502 |
| 5,929,849 A | * | 7/1999 | Kikinis | 725/113 |
| 5,956,377 A | * | 9/1999 | Lang | 375/372 |
| 5,987,509 A | * | 11/1999 | Portuesi | 725/113 |
| 6,006,241 A | * | 12/1999 | Purnaveja et al. | 715/512 |
| 6,018,768 A | * | 1/2000 | Ullman et al. | 709/218 |
| 6,061,719 A | * | 5/2000 | Bendinelli et al. | 709/218 |
| 6,128,653 A | * | 10/2000 | del Val et al. | 709/219 |
| 6,163,803 A | * | 12/2000 | Watanabe | 709/217 |
| 6,173,317 B1 | * | 1/2001 | Chaddha et al. | 709/219 |
| 6,215,483 B1 | * | 4/2001 | Zigmond | 725/112 |
| 6,223,221 B1 | * | 4/2001 | Kunz | 709/224 |
| 6,239,793 B1 | * | 5/2001 | Barnert et al. | 715/500.1 |
| 6,278,717 B1 | * | 8/2001 | Arsenault et al. | 370/477 |
| 6,279,029 B1 | * | 8/2001 | Sampat et al. | 709/203 |
| 6,327,418 B1 | * | 12/2001 | Barton | 386/46 |
| 6,337,883 B1 | * | 1/2002 | Tanaka | 375/240.25 |
| 6,418,471 B1 | * | 7/2002 | Shelton et al. | 709/227 |
| 6,449,653 B2 | * | 9/2002 | Klemets et al. | 709/231 |
| 6,493,832 B1 | * | 12/2002 | Itakura et al. | 713/600 |
| 6,510,279 B1 | * | 1/2003 | Morishita | 386/96 |
| 6,636,219 B2 | * | 10/2003 | Merrick et al. | 345/473 |
| 2001/0013068 A1 | * | 8/2001 | Klemets et al. | 709/231 |

FOREIGN PATENT DOCUMENTS

JP          2001265821 A   *   9/2001   .......... G06F/17/40

OTHER PUBLICATIONS

IBM TDB vol. 41, issue 1, p. 711–712, Title: "Information retrieval and presentation apparatus with version control"; dtd.Jan. 1, 1998.*

* cited by examiner

*Primary Examiner*—Lynne H. Browne
*Assistant Examiner*—Nitin Patel
(74) *Attorney, Agent, or Firm*—Blakely, Sokoloff, Taylor & Zafman LLP

(57) ABSTRACT

A method and system that synchronizes time-related data in a digital processing system. The data to be synchronized includes display data such as audio or video data and command data such as uniform resource locators., The data is encoded with time indicators that allow the media data, through the execution of a set of instructions, to be processed synchronously with the display data.

44 Claims, 11 Drawing Sheets

US 6,802,019 B1

METHOD AND SYSTEM FOR SYNCHRONIZING DATA

FIELD OF THE INVENTION

The present invention relates generally to the synchronization of transmitted data, and more particularly to a method and system for synchronizing the reception of command data, such as network browsing commands, or other similar data, with media data, such as audio and/or video data.

BACKGROUND

Use of internet-related networks (e.g., the World Wide Web) for multi-media conferencing presentations has increased dramatically in recent years. A conference moderator may communicate through audio and/or video transmissions, and may, as well, direct a conference participant to information stored on a computer network (e.g., Web pages). U.S. Pat. No. 5,944,791 describes an example of a presentation using the web. For coordination of the conference it is desirable for the moderator to be able to initiate and direct the participant's receipt of such information (so-called collaborative web browsing). To do this the moderator must send command data, such as uniform resource locator (URL) data, to the participant's digital processing system (DPS).

Unfortunately the Web browser command data is transmitted and received much quicker (e.g., about 2 seconds in a typical situation) than the associated audio and/or video data (e.g., about 20–40 seconds in a typical situation). FIG. 1 shows the transmission of data to a participant DPS. The multimedia conferencing system 100 of FIG. 1 is comprised of a controlling server 110 and a participant DPS 120. As shown in FIG. 1, media data transmitted from the controlling server takes 20–45 seconds to be received by the participant DPS whereas the URL data is transmitted and received in about 2 seconds. This is due to the fact that audio and/or video data must be processed and buffered to effect a smooth and seemingly continuous reception and display at the participant DPS. Therefore, when the moderator sends the participant(s) a URL command so that the participant will view a particular Web page, the moderator's audio and/or video transmission associated with that particular Web page is delayed. This has a disconcerting affect on the conference.

SUMMARY OF THE INVENTION

A method is described for processing data that satisfies the need to have the information directed by command data displayed to a conference participant in coordination (e.g., at the same time) as the associated audio and/or video data is displayed. A data processing method according to one exemplary embodiment of the present invention comprises receiving media data with a time indicator associated with it and receiving command data having a, corresponding time indicator associated with it. The media data and command data is processed such that presentation data associated with the command data is processed synchronously with the associated media data. Other exemplary methods and systems are also described.

Other features and advantages of the present invention will be apparent from the accompanying drawings and from the detailed description that follows below.

BRIEF DESCRIPTIONS OF THE DRAWINGS

The present invention is illustrated by way of example and not limitation in the figures of the accompanying drawings, in which like references indicate similar elements, and in which.

DETAILED DESCRIPTION

Methods and apparatuses are described for receiving media data (which may include audio and/or video data) having a time indicator and command data (which may include uniform resource locators (URLs)) having an associated time indicator, and processing the data such that presentation data associated with the command data is processed synchronously with the associated media data. This allows Web conference participants to view a Web page, as directed by the conference moderator, while at the same time receive the audio and/or video data associated with that web page.

Figure 1:
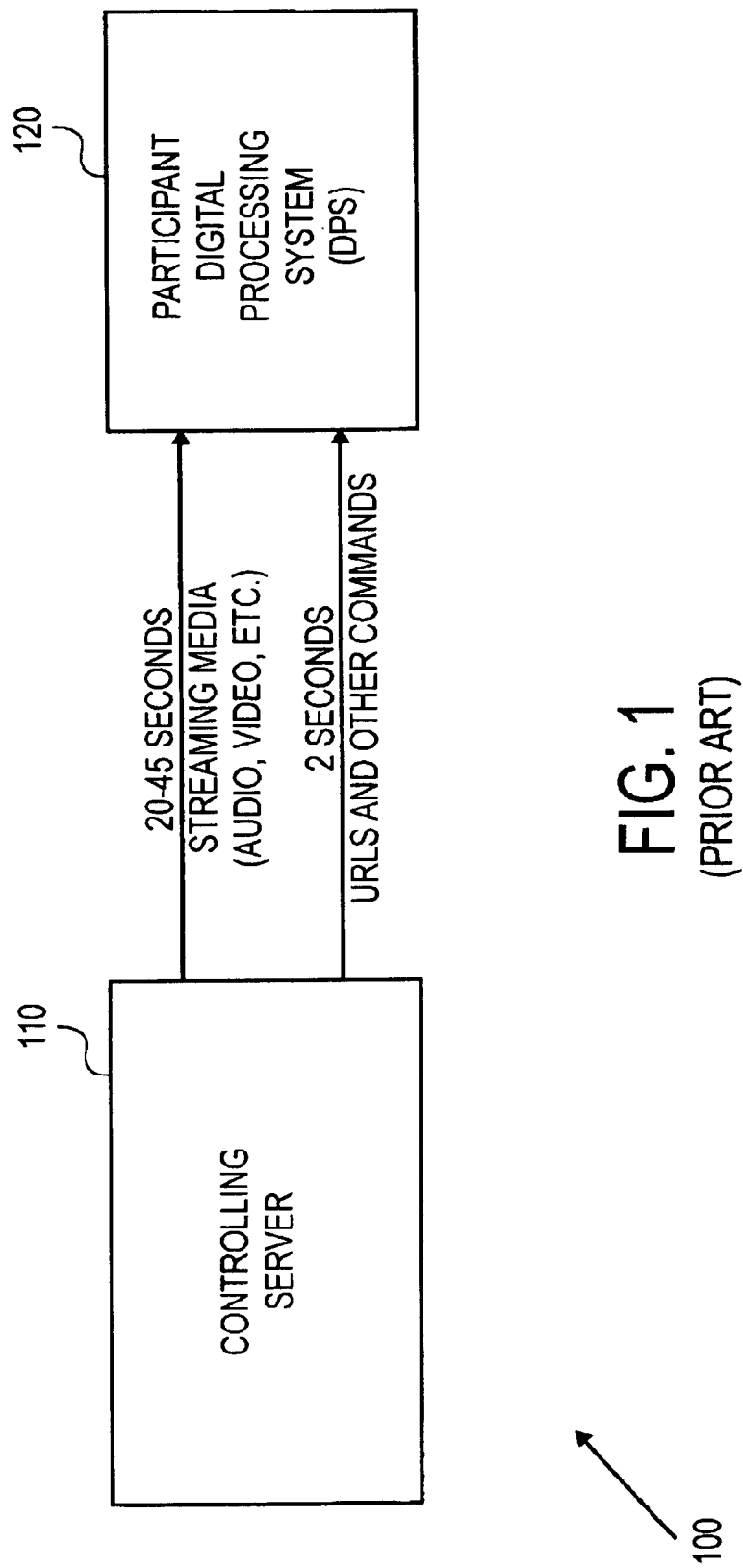
FIG. 1 is a diagram of prior art transmission of data to a participant DPS in a multimedia conferencing system.
Figure 2:
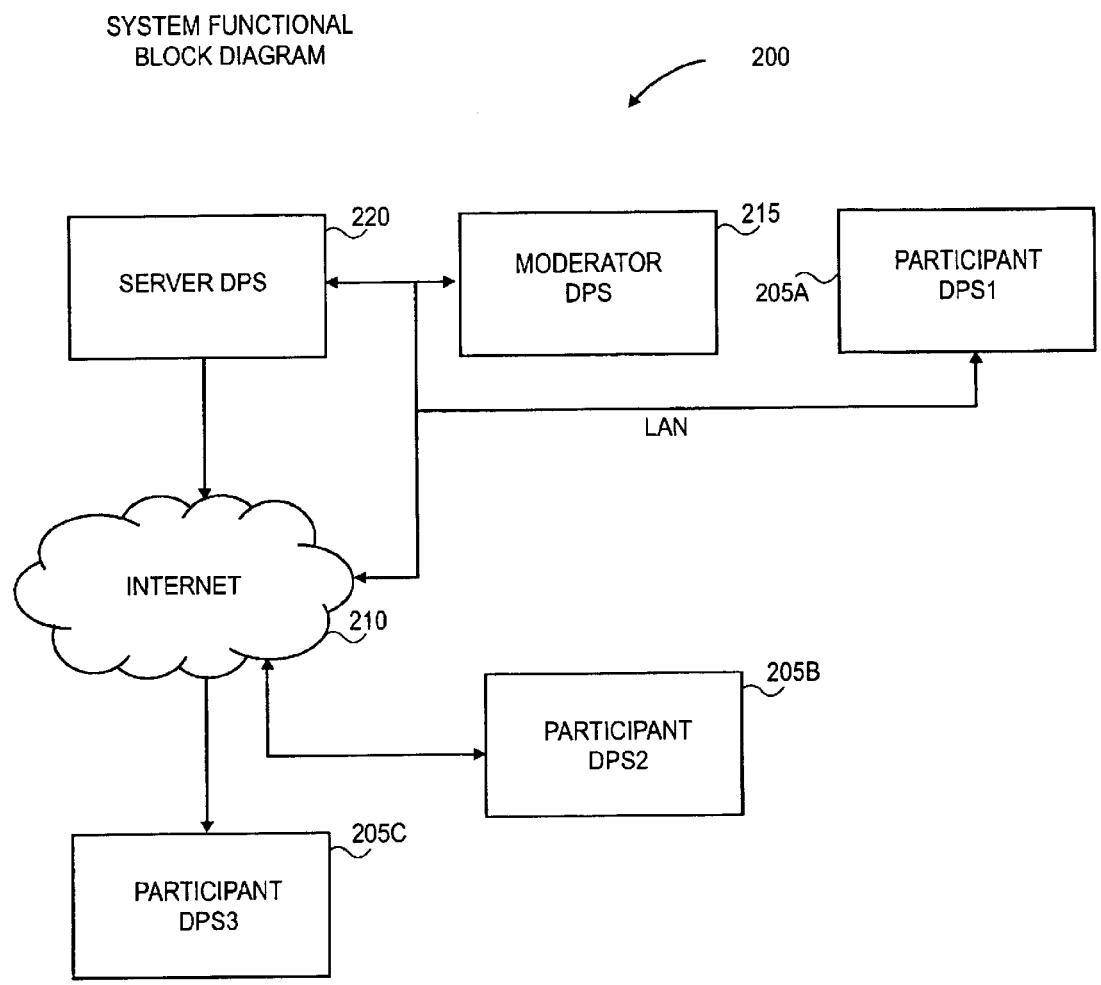
FIG. 2 is a functional block diagram of one embodiment of a system for practicing the present invention.

FIG. 2 is a diagram of a network of DPSs 200 in which media and command data may be received and processed according to one embodiment of the present invention. The network of DPSs 200 can function as a multimedia conferencing system. As shown in FIG. 2, a plurality of local or remote participant DPSs 205a, 205b, and 205c, are coupled, through internet 210, to at least one moderator DPS 215 and a server DPS 220. The internet 210 is a network of networks through which information is exchanged by methods well known to those in the art (e.g., the use of TCP and IP protocols, etc). The moderator DPS causes the sending of media data and command data, through the internet, to the participant DPSs. The two types of data may require synchronizing.

The moderator DPS 215 would typically be controlled by a moderator of a conference who would also perhaps be talking and having his or her picture captured (e.g., through a video camera). The sound of the moderator's voice (or other voices or sounds) would be captured by a microphone (e.g., captured by a microphone at the moderator's DPS) and digitized and then caused to be transmitted. In one exemplary embodiment, the server DPS 220 receives the digitized sounds and images from the moderator's DPS 215 and transmits, as streaming data, the sounds and images to the participant DPSs 205a, 205b, and 205c. The participant DPSs receive these sounds and images and causes these sounds and images to be played back to the users or viewers of the participant DPSs (e.g., the DPSs are executing a streaming media playback software, such as Real Player from RealNetworks, Inc. of Seattle, Washington, to cause the sounds and images to be played back). The operator of the moderator DPS may also be using a web browser (e.g., Netscape's Navigator available from AOL of Dulles, Va., or Microsoft's Internet Explorer available from Microsoft Corporation of Redmond, Wash.) and selecting URLs to go to different web pages or to present other data as part of the conference. These selected URLs are captured by the moderator's DPS and time stamped, as described herein, and are transmitted to the participant DPSs in order to cause these participant DPSs to go to these different web pages. Further details concerning the operation of server DPS 220, moderator DPS 215, and the participant DPSs 205a, 205b, and 205c are provided below.

Figure 3:
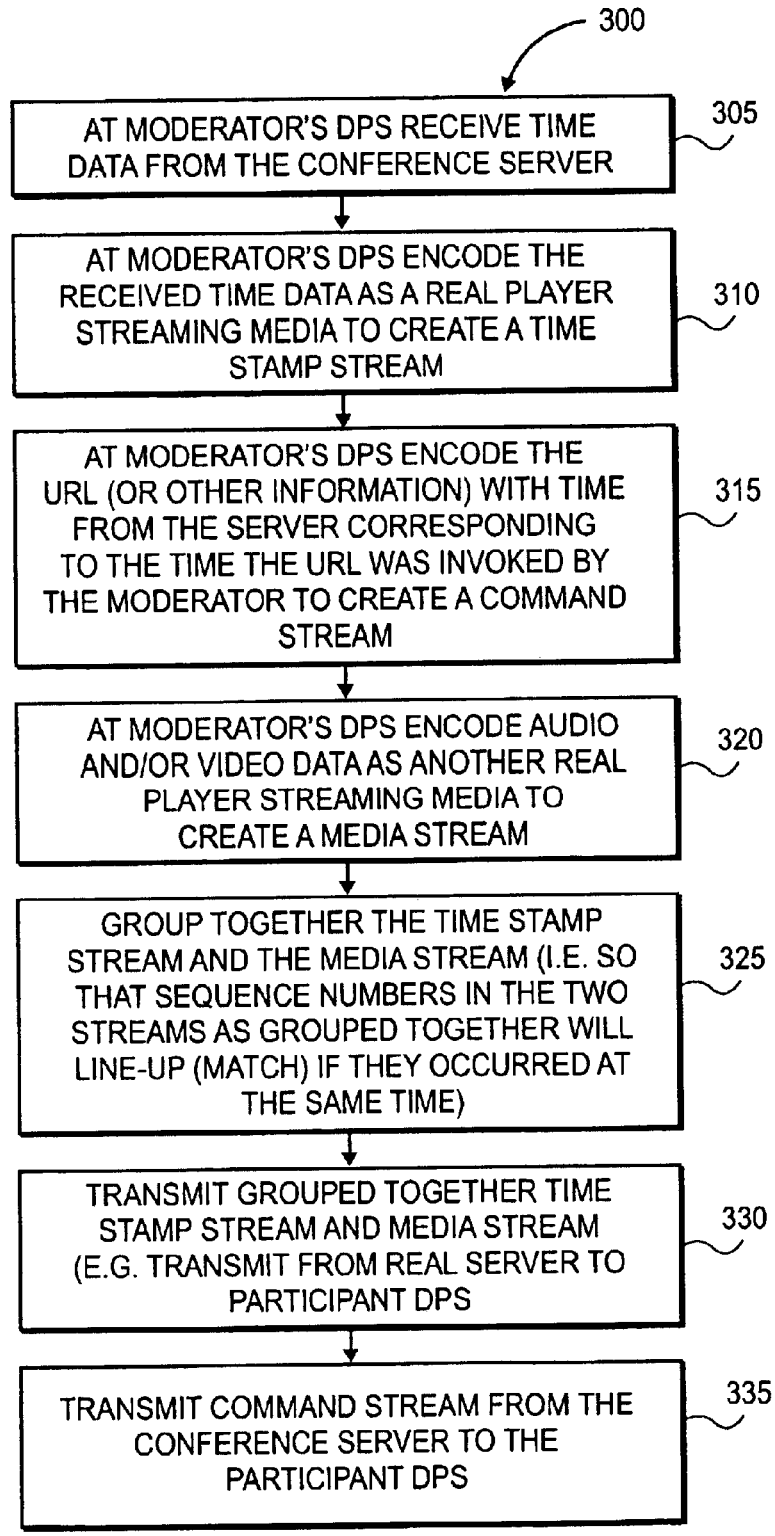
FIG. 3 is a flow chart showing a process of one embodiment for a moderator DPS.

FIG. 3 shows a method by which the media data is associated with a time indicator and the command data is associated with a time indicator and by which the data is then transmitted to the participant DPS. The method 300 shown in FIG. 3 begins at operation 305, in which time data is received from the conference server DPS (e.g., DPS 220) by a moderator DPS (e.g., DPS 215). In operation 310 the moderator DPS 215 encodes the received time data as a Real Player streaming media to create a time stamp stream. Time stamps exemplify one type of time indicator. The encoding could take place at the server DPS 220 and does not necessarily need to take place at the moderator DPS 215. In operation 315, the moderator DPS 215 encodes the URLs, or other commands or data, with time data from the server, corresponding to the time the URL was invoked by the moderator, this time is determined as described below in reference to Moderator Applet 420 shown in FIG. 4. This creates a command stream. These URLS would typically be URLs that are selected by an operation of the moderator DPS (e.g., a next web page to go to in the conference). In operation 320 the Moderator DPS encodes audio and/or video data as another Real Player streaming media to create a media stream.

In operation 325 the streaming media software groups together the time stamp stream and the media stream (e.g., the sequence numbers in the two streams are grouped together so that these sequence numbers will line-up/match if they occurred at the same time). The grouping of the time stamp stream and the media stream can take place at the server DPS (e.g., Server 220) using, for example, Microsoft's Net Show Server (available from Microsoft Corporation of Redmond, Wash.) or the grouping can take place at the participant DPS using, for example, Real Player software (available from RealNetworks, Inc. of Seattle, Wash.). The streaming media software buffers the data so that audio signals and video signals, which occurred at the same time, will be received simultaneously. This buffering process helps to obtain a coherent audio/visual transmission which would not otherwise be possible due to the difference in processing/transmission rates of audio and video data.

In operation 330 the server (e.g., server 220) transmits the grouped together time stamp stream and media stream to participant DPSs and in operation 335 the command stream is transmitted to the participant DPSs.

Figure 4:
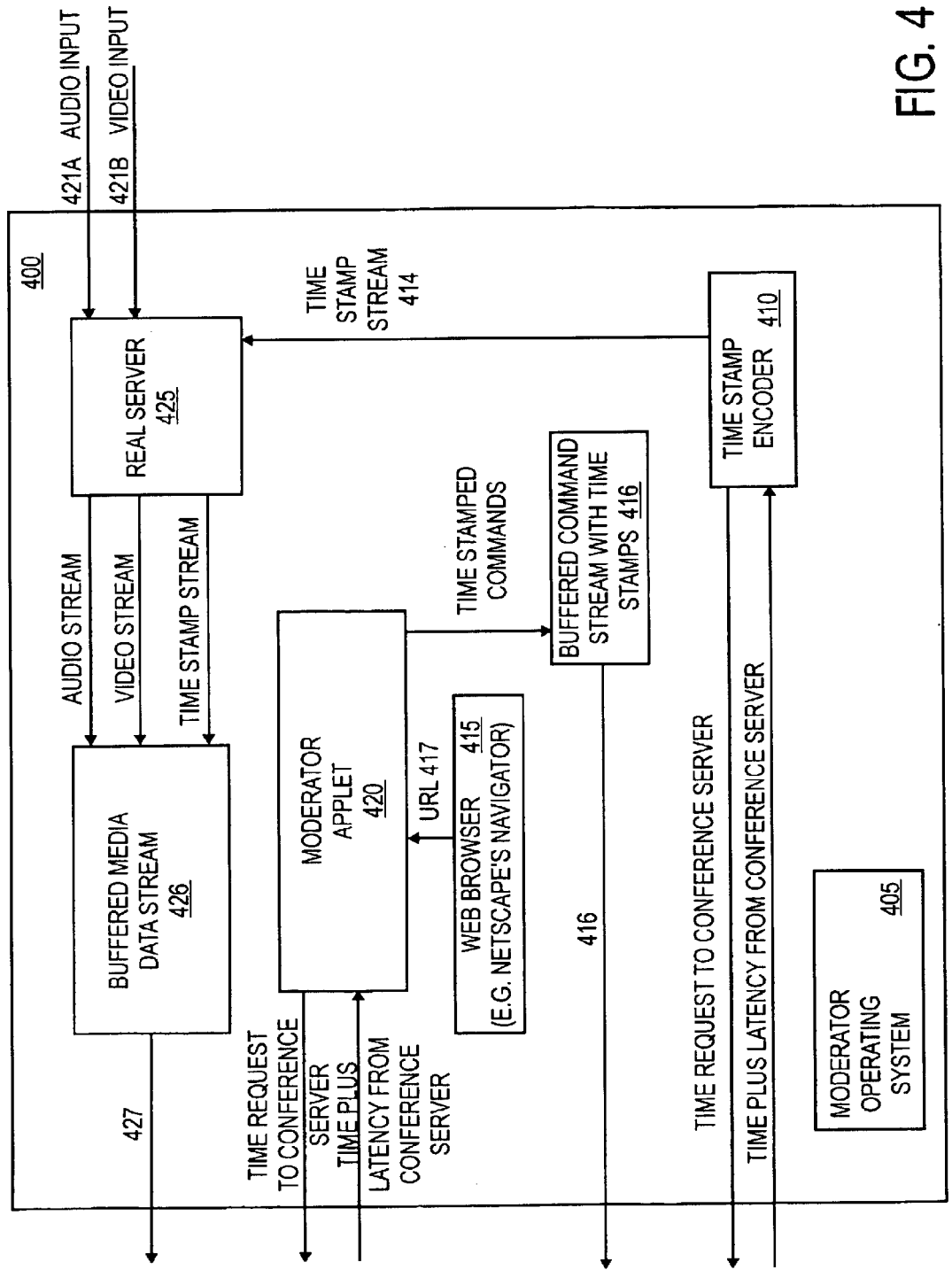
FIG. 4 is a software media diagram which includes representations of executable program instructions that may be executed by the moderator DPS.

FIG. 4 depicts an example of a software storage medium 400 of the moderator DPS which includes an operating system 405, a time stamp encoder 410, a web browser 415 (e.g., Netscape's Navigator available from AOL of Dulles, Va.), a moderator applet 420, and Real Server 425. The time stamp encoder 410 requests current time from a conference server as described below with reference to FIG. 5 (e.g., conference server 515). The latency of the communication between time stamp encoder 410 and server 515 is adjusted for by dividing the total communication time by two; this approximates the time for the conference server 515 to transmit the current time to the time stamp encoder 410. The time stamp encoder 410 compares this time to its own machine clock and remembers the difference. This difference is added to the time stamp encoder's 410 machine clock and is used to create a time stamp stream 414. The applet 420 also requests current time from a conference server as described below with reference to FIG. 5 (e.g., conference server 515). Again, the latency of the communication between applet 420 and server 515 is adjusted for by dividing the total communication time by two. This approximates the time for the conference server 515 to transmit the current time to the applet 420. The applet 420 compares this time to its own machine clock and remembers the difference. This difference is added to the applet's 420 machine clock for each command it sends. The applet 420 also receives URL command data 417 (or other commands or data which is to be transmitted with other data) from the web browser 415 and encodes the URL command data with time stamps from the server thus creating a buffered command stream 416. The applet 420 and the time stamp encoder 410 both adjust their machine clocks to the time received from the conference server as described above and as described below in greater detail in reference to FIG. 6. The output of time stamp encoder 410 (i.e., the time stamp stream 414) and the output of applet 420 (i.e., the buffered command stream 416) now include associated time stamps. The Real Server 425 receives audio data 421a and/or video data 421b and encodes the data as streaming media to create a buffered media data stream 426. The time stamp stream 414, the media stream 426, and the command stream 416 are processed and transmitted to the participant DPS as described above in reference to FIG. 3. The command stream 416 is transmitted to the participant DPS separately in a parallel process. Neither time stamp encoder 410 nor Real Server 425 must necessarily reside on the moderator DPS—either, or both, could reside on a server DPS.

Figure 4A:
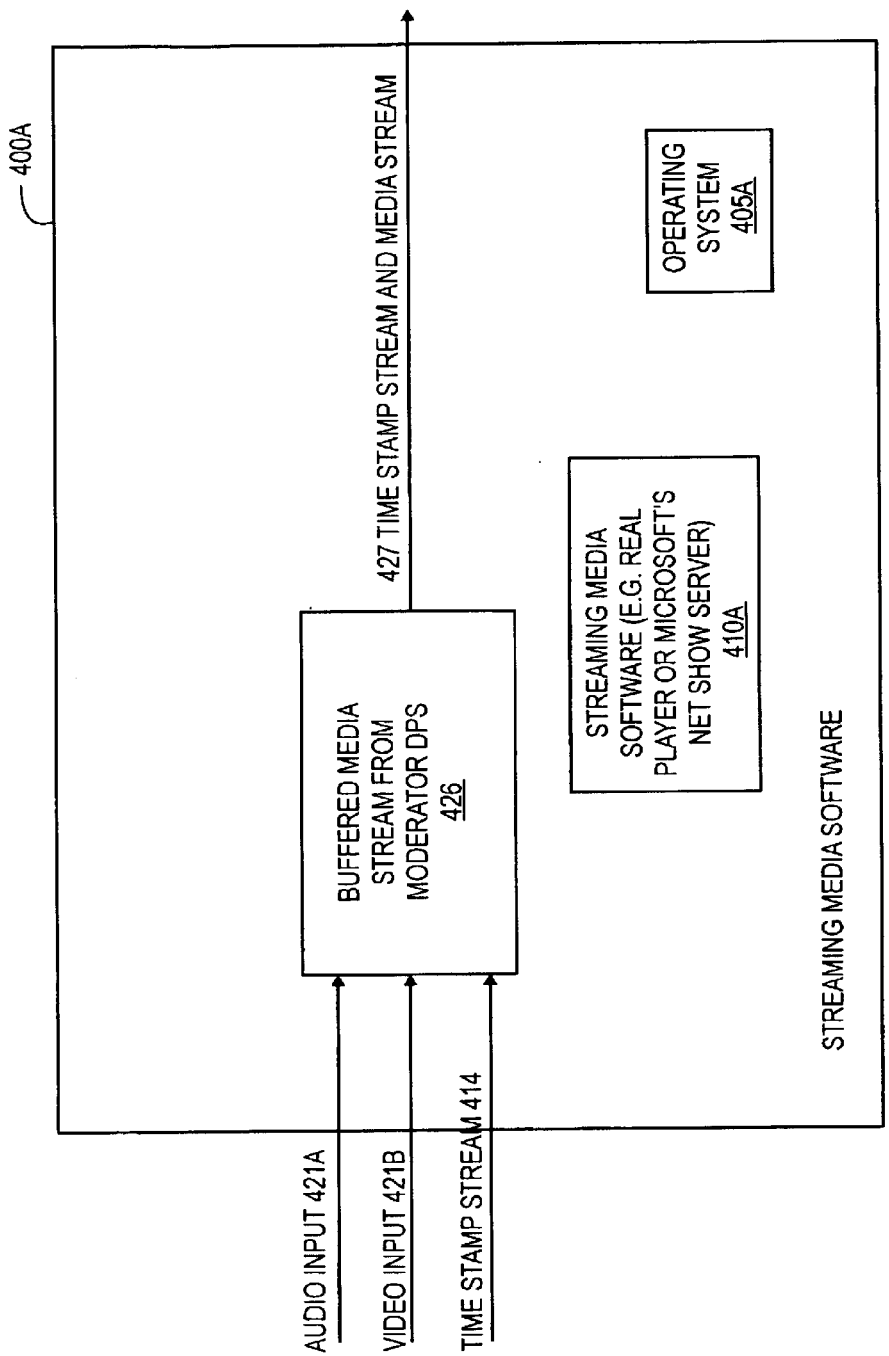
FIG. 4A is a streaming media software diagram which includes representations of executable program instructions that may be executed by the participant DPS or server DPS.

FIG. 4A depicts an example of a streaming media software system 400A which includes an operating system 405A and streaming media software 410A. 410A could be Real Player or Microsoft's Net Show Server depending on whether the grouping of the media streams and the time stamp stream take place at the participant DPS or at the server DPS. The streaming media software 410A groups the audio input 421a, the video input 421b and the time stamp stream together. After the grouping 426 is accomplished, the grouped together time stamp stream and media stream 427 is transmitted to the participant DPSs as described below in reference to FIG. 8.

Figure 5:
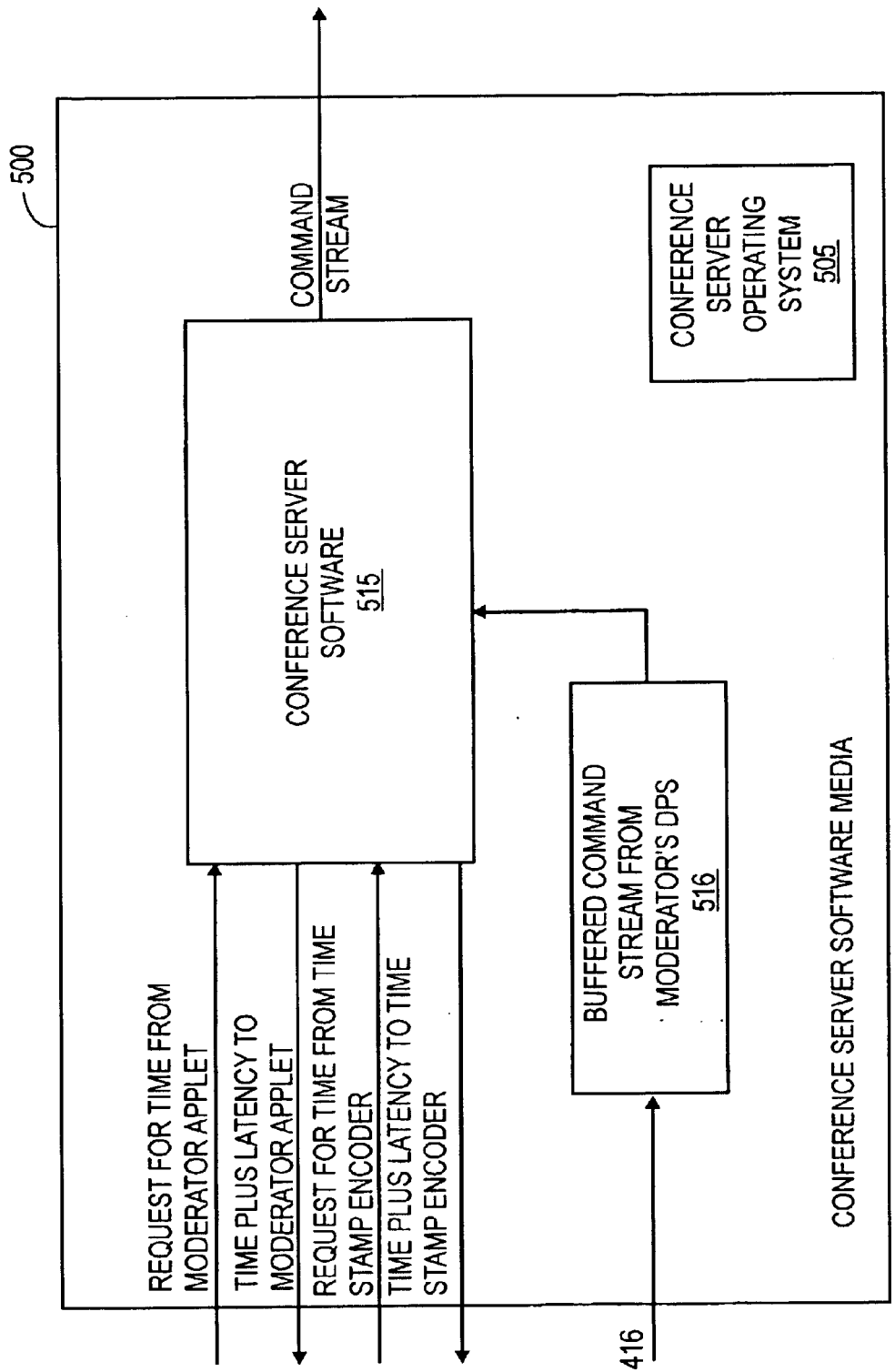
FIG. 5 is a software media diagram that includes representations of executable program instructions that may be executed by a conference server DPS.

FIG. 5 depicts an example of a software storage medium 500 of the conference server DPS which includes an operating system 505, and conference server software 515. The moderator applet 420 requests the current time from the conference server software 515 and a differential is calculated and added to the applet's 420 machine clock as described above in reference to FIG. 4, applet 420. The time stamp encoder 410 requests the current time from the conference server software 515 and a differential is calculated and added to the time stamp encoder's 410 machine clock as described above in reference to FIG. 4. The conference server software 515 receives the buffered command stream 516 from the moderator DPS and transmits the command stream to the participant DPSs.

Figure 6:
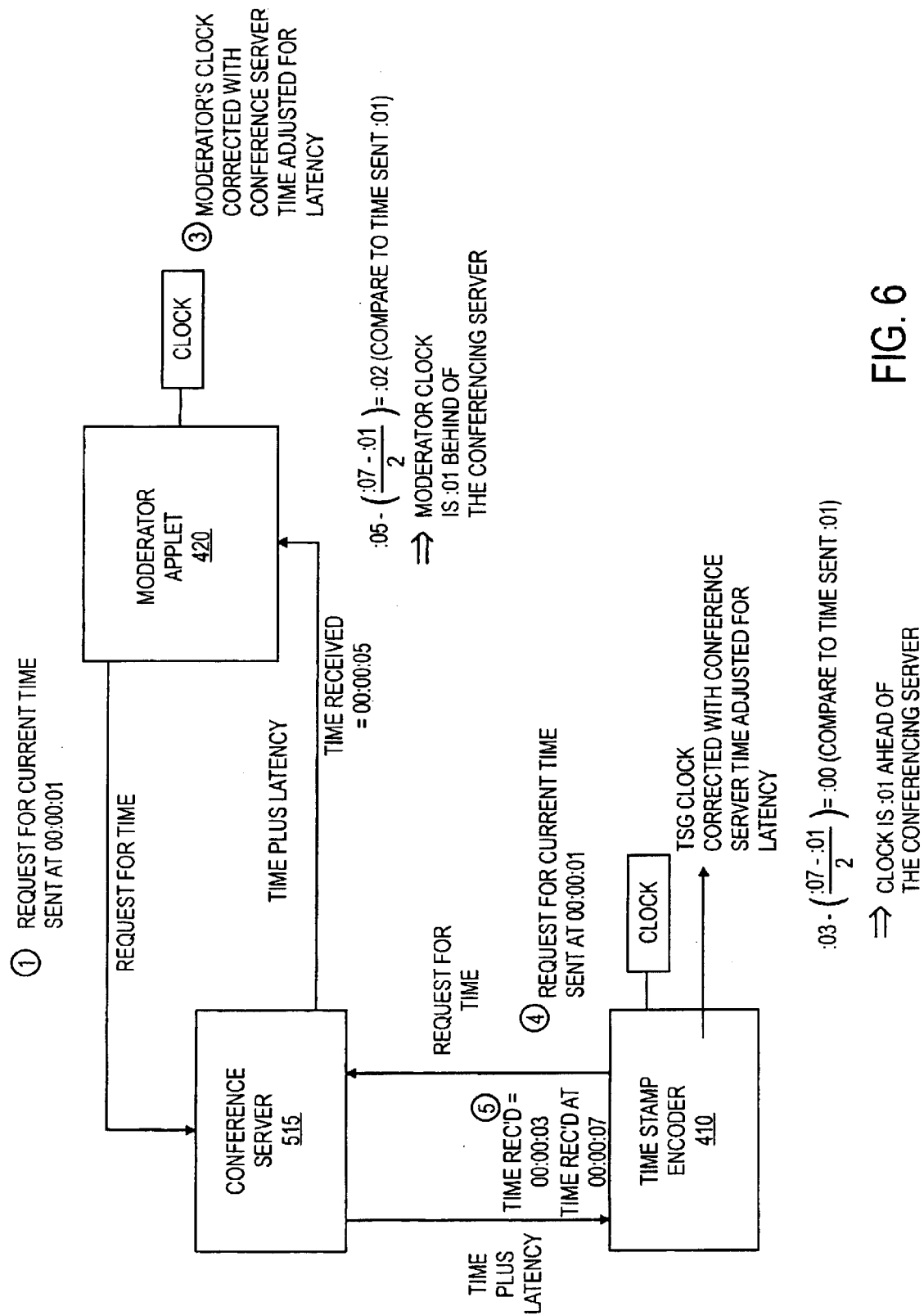
FIG. 6 is a diagram of one embodiment of the synchronizing process.

FIG. 6 depicts in greater detail one embodiment of how the moderator applet 420 and the time stamp encoder 410 request time from the conference server 515, receive time plus latency from the conference server 515, and adjust for the latency. For example as shown in FIG. 6, the moderator applet 420 sends a request for current time to the conference server 515 at time 00:00:01. The conference server 515 replies with a current time of 00:00:05 which is received by the moderator applet 420 at time 00:00:07. The moderator applet 420 adjusts for the latency in communication by taking the total time to send the request and receive the reply (i.e., 00:00:07 minus 00:00:01 equals 6 seconds) and dividing by 2 (i.e., 6 seconds divided by 2 equals 3 seconds). This approximates the amount of time required for the conference server 515 to send the current time back to the moderator applet 420. The moderator applet 420 then subtracts this time from the time at which current time was received to determine what time the conference server clock had at the time the moderator applet 420 requested current time (i.e., 00:00:05 minus 3 seconds equals 00:00:02). The moderator applet 420 then compares this time (00:00:02) to the time at which the request for current time was sent (00:00:01) and determines that the conferencing server clock is 1 second ahead of the moderator applet clock. The moderator applet 420 will therefore add 1 second to its machine clock for each command it sends. Meanwhile the time stamp encoder 410 contacts the conference server 515 and requests current time at time 00:00:01. The conference server 515 replies with a current time of 00:00:03 which is received by the time stamp encoder 410 at time 00:00:07. The time stamp encoder 410 adjusts for the latency in communication by taking the total time to send the request and receive the reply (i.e., 00:00:07 minus 00:00:01 equals 6 seconds) and dividing by 2 (i.e., 6 seconds divided by 2 equals 3 seconds). This approximates the amount of time required for the conference server 515 to send the current time back to the time stamp encoder 410. The time stamp encoder 410 then subtracts this time from the time at which current time was received to determine what time the conference server clock had at the time the time stamp encoder 410 requested current time (i.e., 00:00:03 minus 3 seconds equals 00:00:00). The time stamp encoder 410 then compares this time (00:00:00) to the time at which the request for current time was sent (00:00:01) and determines that the conference server clock is 1 second behind the time stamp encoder clock. The time stamp encoder machine clock is then adjusted for this differential (i.e., 1 second is subtracted) and time stamps are generated and broadcast. Those skilled in the art will appreciate that there are other methods for the moderator applet 420 and the time stamp encoder 410 to adjust their machine clocks to match that of the conference server 515 other than described above in reference to FIG. 6.

Figure 7:
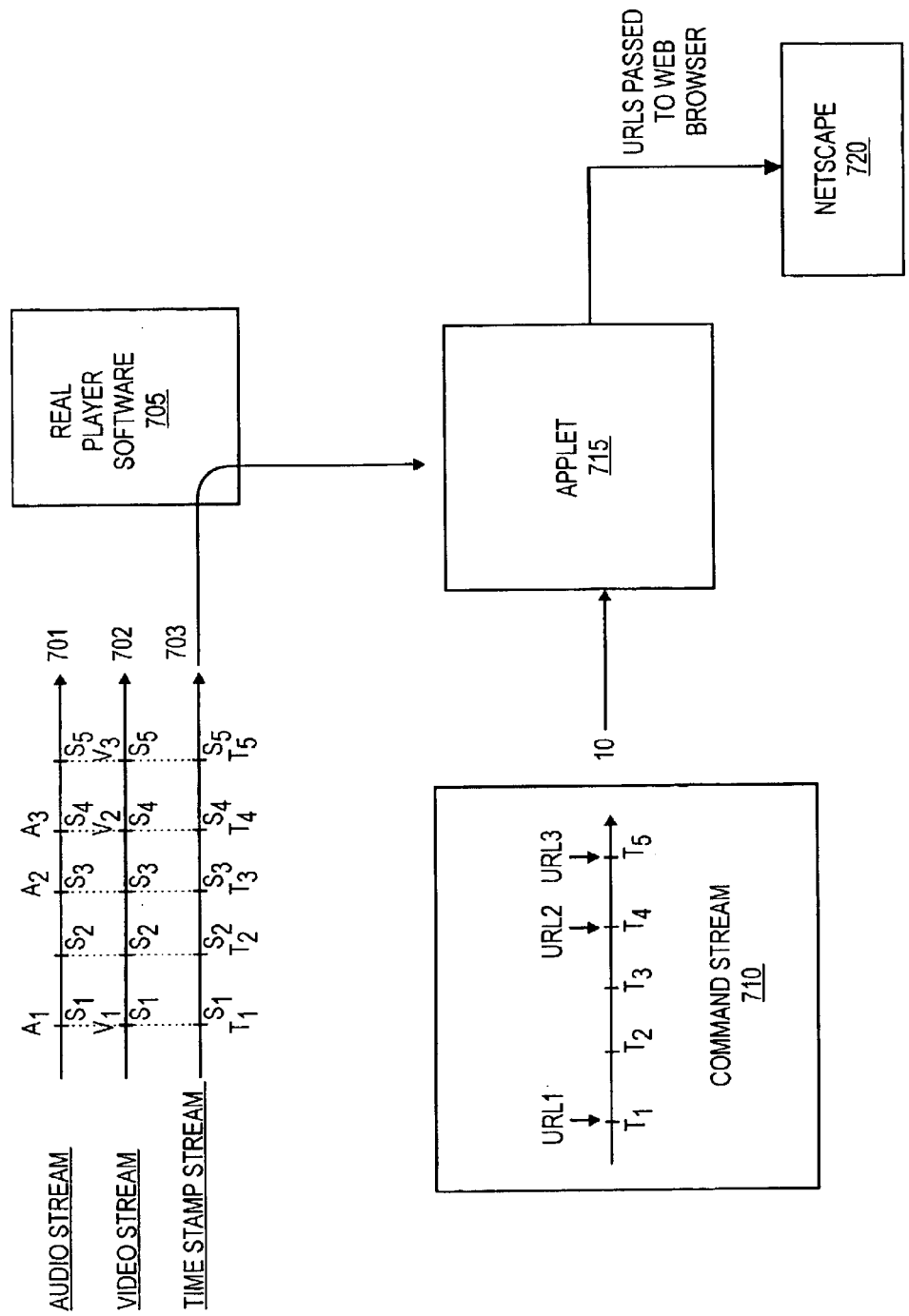
FIG. 7 is a flow chart showing the process of one embodiment for a participant DPS.

FIG. 7 depicts how the participant DPS receives and processes the data streams. As depicted, the audio, video, and URL data that occurred at a given time are now all referenced to that time. The grouped together media stream (consisting of audio stream 701, and/or video stream 702) and time stamp stream 703 are input to the streaming data player software 705 which is executed on a participant DPS (e.g., Real Player software). Real Player software 705 passes the time signals from the time stamp stream 703 to the Conference Viewer applet 715 (a control application program) which has also received the command stream 710 containing URLs and time stamps associated with those URLs. The Conference Viewer applet 715 buffers the command stream 710 and determines when to transmit the URLs to a web browser and transmits the URLs to a Web browser 720 (e.g., Navigator) when they were issued in relation to the audio and/or video signals. For example, because audio data $A_3$ and video data $V_2$ occurred at time $T_4$ and $URL_2$ also occurred at time $T_4$, the information associated with $URL_2$ will be displayed substantially concurrently with the presentation of audio data $A_3$ and video data $V_2$. Typically, in one embodiment, the Conference Viewer applet 715 will receive the time stamp stream 703. For each time stamp, or other time indicator on the stream 703, the applet 715 determines whether a URL, at that same time stamp, exists on the command stream 710. If a URL (or other command or data) exists at that same time stamp, then the URL is passed from the applet 715 to web browser 720. Alternatively, the applet 715 may pass the URL (or other command or data) to another software program for the appropriate presentation of data in response to the URL (or other command or data). Alternatively, the applet 715 may itself execute or process the URL (or other command or data) to cause the appropriate presentation of data. In one embodiment the URL is passed to the web browser substantially at the same time as the presentation by Real Player of the audio and/or video data at the appropriate time. In an alternative embodiment, the URL (or other command or data) may be passed or otherwise processed substantially synchronously with the presentation by Real Player of the audio and/or video data such that the two events ((a) passing or processing of the URL and (b) presentation of the audio and/or video data) occur within a predetermined time relationship. That is, this synchronization may mean that the predetermined time relationship is substantially zero seconds (so the two events occur substantially at the same time). Alternatively, this synchronization may mean the predetermined time relationship is several seconds (so that one event occurs, according to the predetermined time relationship, several seconds after the other event).

One or more of the participant DPSs may represent one implementation of the receiving and processing system described below with reference to FIG. 8.

Figure 8:
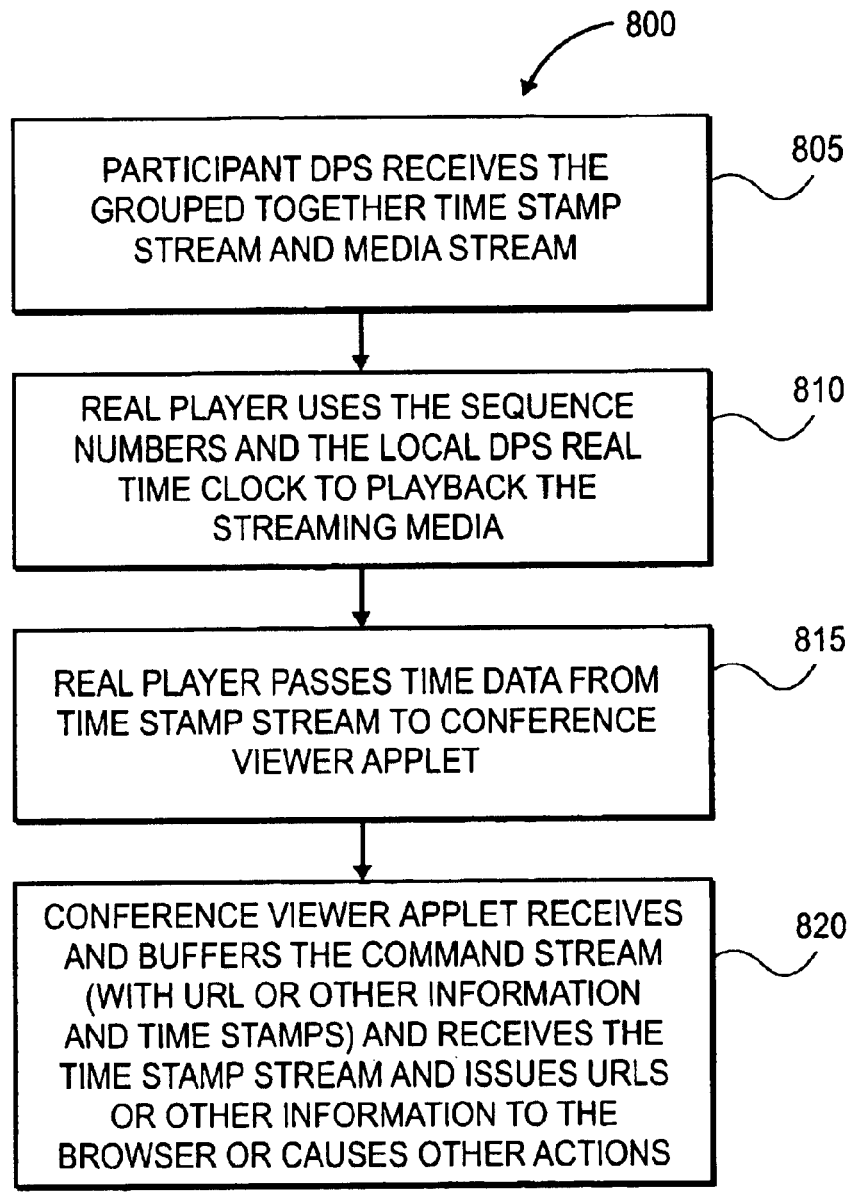
FIG. 8 is a software media diagram that includes representations of executable program instructions that may be executed by a participant DPS.

FIG. 8 shows one example of a data receiving and processing method according to an embodiment of the present invention. The method 800 shown in FIG. 8 begins in operation 805, in which the participant DPS receives the grouped together time stamp stream and media stream.

In operation 810 a streaming data player, such as Real Player, executing on a participant DPS uses the sequence numbers (e.g., $S_1$, $S_2$, etc.) shown along with streams 701 and 702 and the local DPS real time clock to playback the media stream.

In operation 815 Real Player software passes time data from the time stamp stream (e.g., stream 703) to a control application program that may be referred to as a Conference Viewer applet. In operation 820 the Conference Viewer applet receives and buffers the command stream (e.g., stream 710) and receives the time stamp stream (e.g., stream 703) and issues URL commands to the browser or causes other actions based on the URLs or commands or other data in the command stream 710.

Thus in one embodiment of the present invention it will be possible for multimedia conference participant to be directed to a particular web page and while viewing the display information from the web page to substantially simultaneously receive the audio and video data associated with it.

Figure 9:
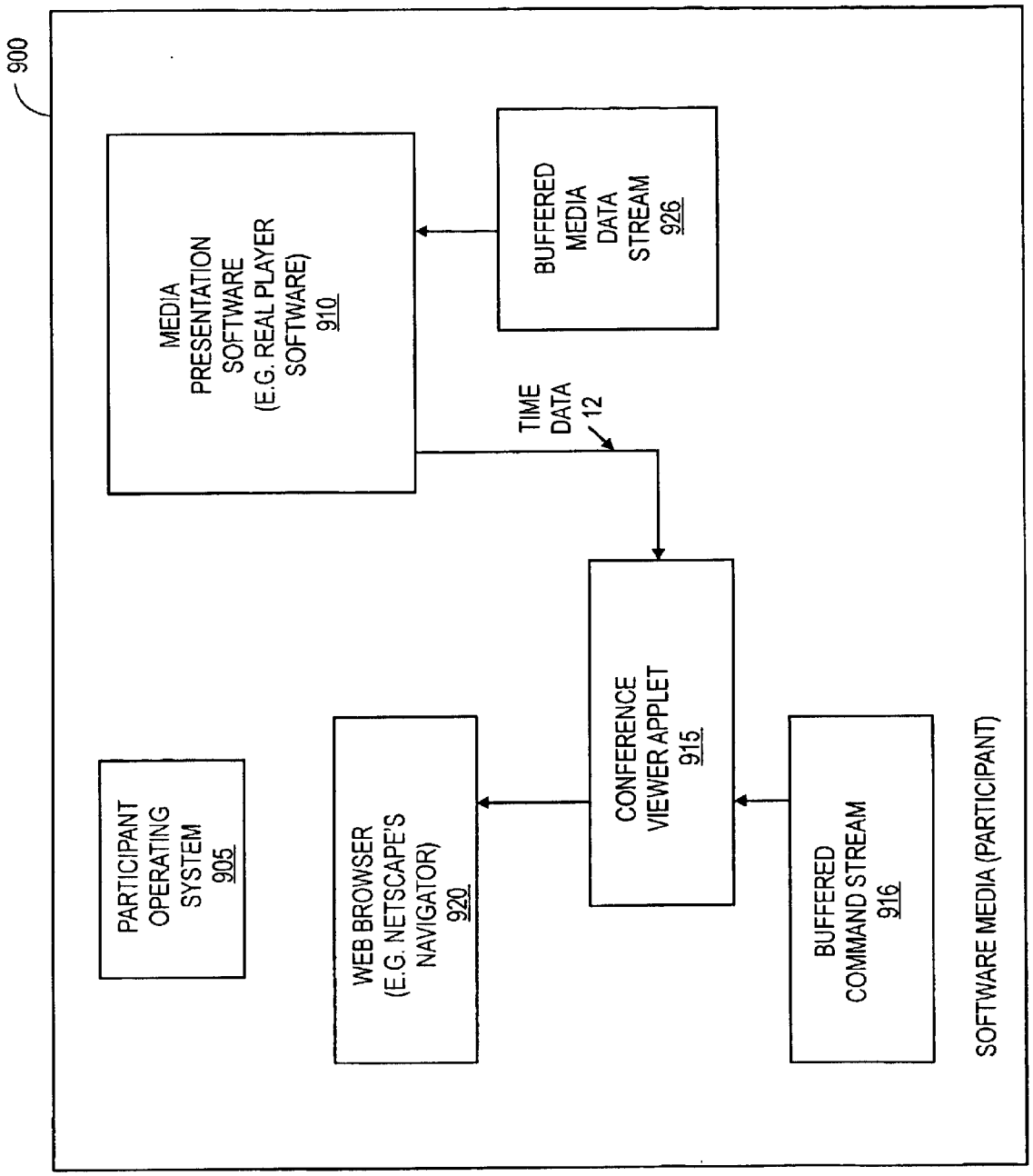
FIG. 9 is an example of the processing of command and media streams at a participant DPS.

FIG. 9 depicts an example of a software storage medium 900 of the participant DPS which includes an operating system 905, media presentation software (e.g., Real Player software) 910, a Conference Viewer applet 915 and a web browser (e.g., Netscapes's Navigator) 920. The media presentation software receives the buffered media data stream 926 and transmits the associated time data 912 to the Conference Viewer applet 915. The Conference Viewer applet also receives the buffered command stream 916. The data is processed as described above in relation to FIG. 8 and the Conference Viewer applet 915 transmits URLs to the web browser 920 or causes other actions.

Figure 10:
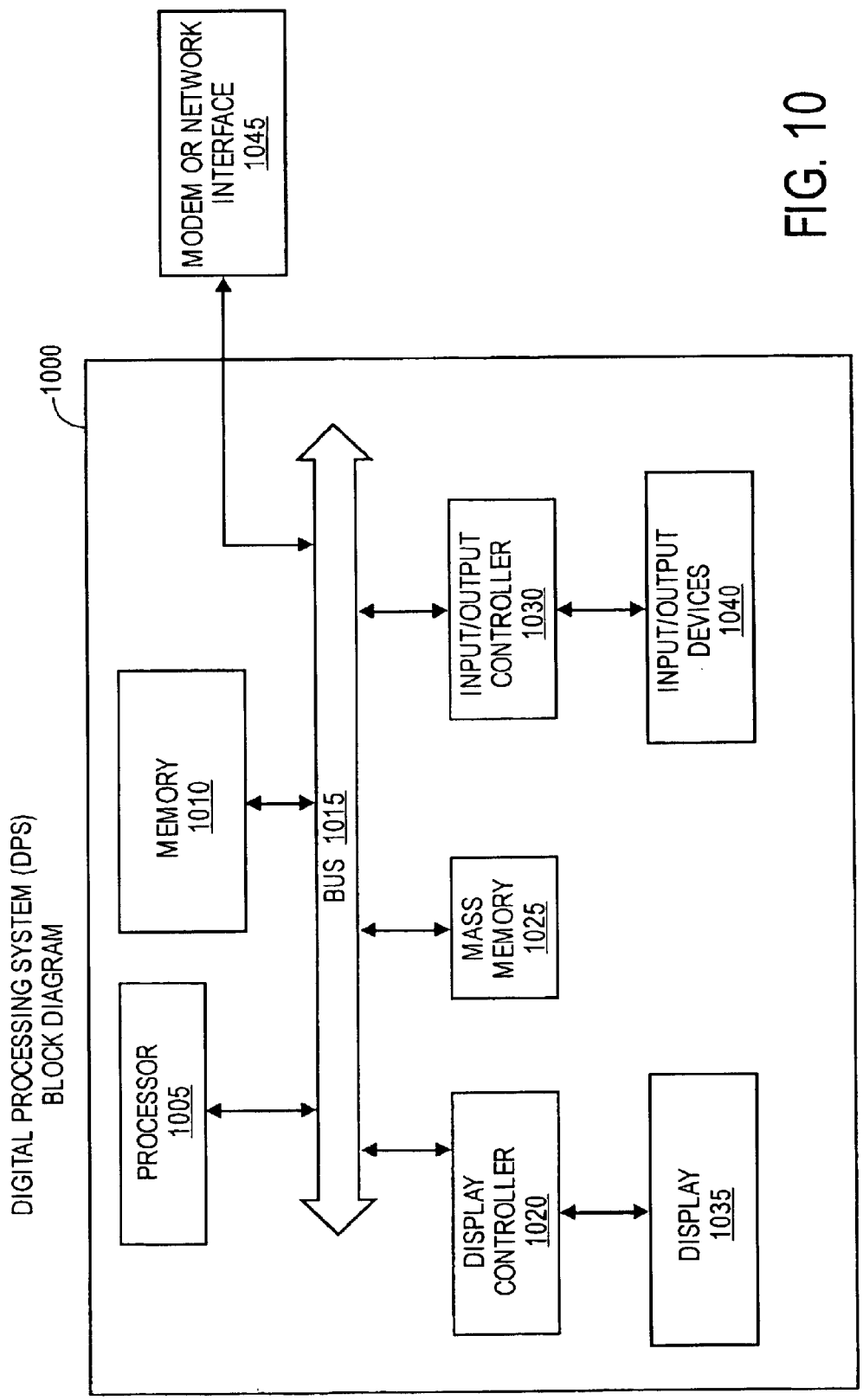
FIG. 10 is a block diagram of one embodiment of a DPS.

FIG. 10 is a block diagram of a digital processing system DPS that may be used in accordance with one embodiment of the present invention. For example, the digital processing system 1000 shown in FIG. 10 may be used as a participant DPS, or a Moderator DPS, or a server DPS, etc. Furthermore, the DPS 1000 may be used to perform one or more functions of an Internet service provider. The DPS 1000 may be interfaced to external systems through a modem or network interface 1045. The modem or network interface may be considered a part of the DPS 1000. The modem or network interface may be an analog modem, an ISDN modem, a cable modem, a token ring interface, a satellite transmission interface, a wireless interface, or other interface(s) for providing a data communication link between two or more DPSs.

The DPS 1000 includes a processor 1005, which may represent one or more processors and may include one or more conventional types of processors, such as Motorola PowerPC processor (available from Motorola, Inc. of Schaumburg, Ill.), an Intel Pentium (or x86) processor (available from Intel Corporation of Santa Clara, Calif.), etc. A memory 1010 is coupled to the processor 1005 by a bus 1015. The memory 1010 may be a dynamic random access memory (DRAM) an/or may include static RAM (SRAM). The processor 1005 may also be coupled to other types of storage areas/memories (e.g., cache, Flash memory, disk, etc.), that could be considered as part of the memory 1010 or separate from the memory 1010.

The bus 1015 further couples the processor 1005 to a display controller 1020, a mass memory 1025 (e.g., a hard disk or other storage which stores all or part of the components shown in the media diagrams of FIGS. 4, 5, and 9 depending on the particular DPS), the modem or network interface 1045, and an input/output (I/O) controller 1030. The mass memory 1025 may represent a magnetic, optical, magneto-optical, tape, and/or other type of machine-readable medium/device for storing information. For example, the mass memory 1025 may represent a hard disk, a read-only or writeable optical CD, etc. The display controller 1020 controls, in a conventional manner, a display 1035, which may represent a cathode ray tube (CRT) display, a liquid crystal display (LCD), a plasma display, or other type of display device. The I/O controller 1030 controls I/O device(s) 1040, which may include one or more keyboards, mouse/track ball or other pointing devices, magnetic and/or optical disk drives, printers, scanners, digital cameras, microphones, etc.

The DPS 1000 represents only one example of a system, which may have many different configurations and architectures and which may be employed with the present invention. For example, Macintosh and Intel systems often have multiple busses, such as a peripheral bus, a dedicated cache bus, etc. On the other hand, a network computer, which may be used as a DPS of the present invention, may not include, for example, a hard disk or other mass storage device, but may receive routines and/or data from a network connection, such as the modem or interface 1045, to be processed by the processor 1005. Similarly, a Web TV system, which is known in the art, may be considered to be a DPS of the present invention, but such a system may not include one or more I/O devices, such as those described above with reference to I/O device 1040. Additionally, a portable communication and data processing system, which may employ a cellular telephone and/or paging capabilities, may be considered a DPS that may be used with the present invention.

In the system 1000 shown in FIG. 10, the mass memory 1025 (and/or the memory 1010) may store media (e.g., video, audio, movies, etc.) that may be processed according to the present invention. Alternatively, media data may be received by the DPS 900, for example, via the modem or network interface 1045, and stored and/or presented by the display 1035 and/or the I/O device(s) 1040. In one embodiment data may be transmitted across a data communication network, such as a LAN and/or the Internet.

In the foregoing specification the invention has been described with reference to specific exemplary embodiments thereof It will, however, be evident that various modifications and changes may be made thereto without departing from the broader spirit and scope of the invention as set forth,in the appended claims. The specification and drawings are, accordingly, to be regarded in an illustrative rather than a restrictive sense.

What is claimed is:

1. A method of processing data, the method comprising:

receiving media data having a first time indicator associated therewith, said media data associated with a presentation by a moderator;

receiving command data having a second time indicator which corresponds to when said command data was invoked by said moderator during said presentation; and processing said media data and said command data such that presentation data associated with said command data is processed substantially synchronously relative to the media data wherein said media data is presented in substantially real time with said presentation.

2. The method of claim 1, wherein receiving said media data having a first time indicator includes receiving a time stamp stream having sequence numbers and a media stream having sequences numbers.

3. The method of claim 2, wherein processing includes comparing the sequence numbers of said time stamp stream and said media stream with the local digital processing system real time clock.

4. The method of claim 1, wherein processing includes buffering said command data.

5. The method of claim 2, wherein processing further includes comparing said command data with said time stamp stream.

6. The method of claim 1, wherein said media data is audio and/or video data.

7. An apparatus for processing data, said apparatus comprising:

a receiving unit, configured to receive media data having a first time indicator associated therewith, said media data associated with a presentation by a moderator, and said receiving unit configured to receive command data having a second time indicator which corresponds to when said command data was invoked by said moderator during said presentation; and a processing unit, coupled to said receiving unit and configured to process said media data and said command data such that display data associated with said command data is processed synchronously with the media data having a corresponding time indicator said processing unit further configured to present said media data in substantially real time with said presentation.

8. The apparatus of claim 7, wherein the receiving unit is further configured to receive a time stamp stream having sequence numbers and a media stream having sequences numbers.

9. The apparatus of claim 8, wherein the processing unit is further configured to compare the sequence numbers of said time stamp stream and said media stream with the local digital processing system real time clock.

10. The apparatus of claim 7, further comprising a buffer configured to buffer said command data.

11. The apparatus of claim 8, wherein the processing unit is further configured to compare said command data with said time stamp stream.

12. The apparatus of claim 7, wherein said media data is audio and/or video data.

13. A machine-readable medium that provides executable instructions, which when executed by a digital processing system, cause said set of processors to perform a method comprising:
    receiving media data having a first time indicator associated therewith, said media data associated with a presentation by a moderator;
    receiving command data having a second time indicator which corresponds to when said command data was invoked by said moderator during said presentation; and
    processing said media data and said command data such that presentation data associated with said command data is processed substantially synchronously relative to the media data wherein said media data is presented in substantially real time with said presentation.

14. The machine-readable medium of claim 13, wherein receiving said media data having a first time indicator includes receiving a time stamp stream having sequence numbers and a media stream having sequences numbers.

15. The machine-readable medium of claim 14, wherein processing includes comparing the sequence numbers of said time stamp stream and said media stream with the local digital processing system real time clock.

16. The machine-readable medium of claim 13, wherein processing includes buffering said other data.

17. The machine-readable medium of claim 14, wherein processing further includes comparing said command data with said time stamp stream.

18. The machine-readable medium of claim 13, wherein said media data is audio and/or video data.

19. A method of processing data, the method comprising:
    receiving time-stamped media data associated with a presentation by a moderator;
    receiving time-stamped uniform resource locator (URL) data corresponding to when said URL data was invoked by said moderator during said presentation; and
    processing said media data and said URL data such that display data associated with said URL data is processed synchronously with the media data having a corresponding time stamp wherein said media data is presented in substantially real time with said presentation.

20. The method of claim 19, wherein receiving said time-stamped media data includes receiving a time stamp stream having sequence numbers and a media stream having sequences numbers.

21. The method of claim 20, wherein processing includes comparing the sequence numbers of said time stamp stream and said media stream with the local digital processing system real time clock.

22. The method of claim 20, wherein processing further includes comparing said time-stamped URL data with said time stamp stream.

23. The method of claim 22, wherein processing further includes issuing URLs to an internet access means.

24. The method of claim 23, wherein said internet access means is a Web browser.

25. The method of claim 19, wherein processing includes buffering said time-stamped URL data.

26. The method of claim 19, wherein said media data is audio and/or video data.

27. An apparatus for processing data, said apparatus comprising:
    a receiving unit configured to receive time-stamped media data associated with a presentation by a moderator and to receive time-stamped uniform resource locator (URL) data corresponding to when said URL data was invoked by said moderator during said presentation; and
    a processing unit, coupled to said receiving unit, configured to process said media data and said URL data such that display data associated with said URL data is processed synchronously with the media data having a corresponding time stamp said processing unit further configured to present said media data in substantially real time with said presentation.

28. The apparatus of claim 27, wherein the receiving unit is further configured to receive a time stamp stream having sequence numbers and a media stream having sequences numbers.

29. The apparatus of claim 28, wherein the processing unit is further configured to compare said URL data with said time stamp stream.

30. The apparatus of claim 29, wherein processing further includes issuing URLs to an internet access means.

31. The apparatus of claim 30, wherein said internet access means is a Web browser.

32. The apparatus of claim 27, wherein the processing unit is further configured to compare the sequence numbers of said time stamp stream and said media stream with the local digital processing system real time clock.

33. The apparatus of claim 27, wherein the processing unit is further configured to buffer said URL data.

34. The apparatus of claim 27, wherein said media data is audio and/or video data.

35. A machine-readable medium that provides executable instructions, which when executed by a digital processing system, cause said set of processors to perform a method comprising:
    receiving time-stamped media data associated with a presentation by a moderator;
    receiving time-stamped uniform resource locator (URL) data corresponding to when said URL data was invoked by said moderator during said presentation; and
    processing said media data and said URL data such that display data associated with said URL data is processed synchronously with the media data having a corresponding time stamp wherein said media data is presented in substantially real time with said presentation.

36. The machine-readable medium of claim 35, wherein receiving said time-stamped media data includes receiving a time stamp stream having sequence numbers and a media stream having sequences numbers.

37. The machine-readable medium of claim 36, wherein processing includes comparing the sequence numbers of said time stamp stream and said media stream with the local digital processing system real time clock.

38. The machine-readable medium of claim 36, wherein processing further includes comparing said URL data with said time stamp stream.

39. The machine-readable medium of claim 38, wherein processing further includes issuing URLs to an internet access means.

40. The machine readable medium of claim 39, wherein said internet access means is a Web browser.

41. The machine-readable medium of claim 35, wherein processing includes buffering said URL data.

42. The machine-readable medium of claim 35, wherein said media data is audio and/or video data.

43. A method of processing data, the method comprising:

associating network resource address data with a time stamp stream to indicate when said network resource address data was invoked by a moderator of a presentation during said presentation;

creating a command stream from said network resource address data which is associated with said time stamp stream; and transmitting said time stamp stream to an encoder to encode presentation data in real time, said presentation data associated with said presentation.

44. The method of claim 43, wherein prior to associating said network resource address data with said time stamp stream, time stamp data received from a server digital processing system is encoded as said time stamp stream.

\* \* \* \* \*